(12) United States Patent
Kitazawa et al.

(10) Patent No.: US 11,571,771 B2
(45) Date of Patent: Feb. 7, 2023

(54) SOLDERING FLUX AND SOLDERING PASTE

(71) Applicant: Senju Metal Industry Co., Ltd., Tokyo (JP)

(72) Inventors: Kazuya Kitazawa, Saitama (JP); Takayuki Kobayashi, Tokyo (JP); Yusuke Kawano, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 57 days.

(21) Appl. No.: 16/630,250

(22) PCT Filed: Jul. 9, 2018

(86) PCT No.: PCT/JP2018/025860
§ 371 (c)(1),
(2) Date: Jan. 10, 2020

(87) PCT Pub. No.: WO2019/013158
PCT Pub. Date: Jan. 17, 2019

(65) Prior Publication Data
US 2020/0130110 A1   Apr. 30, 2020

(30) Foreign Application Priority Data

Jul. 12, 2017   (JP) .............................. JP2017-136138

(51) Int. Cl.
*B23K 35/362* (2006.01)
*B23K 35/02* (2006.01)

(52) U.S. Cl.
CPC .......... *B23K 35/362* (2013.01); *B23K 35/025* (2013.01)

(58) Field of Classification Search
CPC ................ B23K 35/362; B23K 35/025; B23K 35/3613; B23K 35/26; B23K 35/3612;
(Continued)

(56) References Cited

U.S. PATENT DOCUMENTS

| 8,434,666 B2 | 5/2013 | Ho et al. | |
| 2010/0233481 A1* | 9/2010 | Isogai | D21H 11/20 428/401 |
| 2018/0221996 A1* | 8/2018 | Volmer | B23K 35/3605 |

FOREIGN PATENT DOCUMENTS

CN   102814603 A  * 12/2012
CN   102814603 A    12/2012
(Continued)

OTHER PUBLICATIONS

CN102814603A English translation (Year: 2020).*
(Continued)

*Primary Examiner* — Robert S Jones, Jr.
*Assistant Examiner* — Jiangtian Xu
(74) *Attorney, Agent, or Firm* — The Webb Law Firm

(57) ABSTRACT

If a flux contains an amount of thixotropic agent necessary for obtaining the effect of suppressing a heating sagging, the amount of flux residue increases, and, if applied for uses that do not involve washing, a large amount of flux residue derived from the thixotropic agent remains around the soldered portions, thereby affecting chemical and electrical reliability; and that washing performance is poor in uses involving washing of the flux residue. Accordingly, this soldering flux contains nanofibers of one or more kinds from among polysaccharides, modified polysaccharides, and incompletely modified polysaccharides being modified from polysaccharides into modified polysaccharides, by an amount of 50 wt ppm or more and 3000 wt ppm or less with respect to a total amount of flux.

4 Claims, 2 Drawing Sheets

(58) Field of Classification Search
CPC .... B23K 1/203; B23K 35/0266; B23K 35/24; C22C 13/00
See application file for complete search history.

(56) References Cited

FOREIGN PATENT DOCUMENTS

| | | | |
|---|---|---|---|
| CN | 105345314 | A | 2/2016 |
| JP | 381092 | A | 4/1991 |
| JP | 2002263884 | A | 9/2002 |
| JP | 2003238674 | A | 8/2003 |
| JP | 200521974 | A | 1/2005 |
| JP | 2011104638 | A * | 6/2011 |
| JP | 2011104638 | A | 6/2011 |
| JP | 2012144388 | A | 8/2012 |
| JP | 201378799 | A | 5/2013 |
| JP | 2014219522 | * | 11/2014 |
| JP | 2014219522 | A | 11/2014 |
| JP | 2015147250 | A | 8/2015 |
| JP | 2016193876 | A | 11/2016 |

OTHER PUBLICATIONS

CN-102814603-A original and English translation (Year: 2020).*
JP2011104638A English translation by machine. (Year: 2021).*
Panda et al ("Synthesis and Applications of Electrospun Nanofibers—A Review", Nanotechnology, Fundamental and Applications, vol. 1 (pp. 399-416) Chapter: 14, Jan. 2013). (Year: 2013).*
JP2014219522 machine translation (Year: 2021).*
"[CNF] On sale as of Apr. 2017 of CNF thickener, "(AUROVISCO)" by Oji holdings corporation", http://www.ctiweb.co.jp/jp/news/products-news/537-cnf-cnf-2017-4.html, Converting Technical Institute on line on Apr. 2017, searched on Jan. 17, 2018.
GOI, "Characteristics and application of TEMPO-oxidized cellulose nanofibril as the thickening Agent", Cellulose Commun., Dec. 1, 2016, p. 187-189, vol. 23, No. 4., English-language Abstract.
Kawasaki, "Efforts for the Practical Use of Cellulose Nanofibers—The Development of Functional Additives", Journal of Pulp and Paper Engineering Society, Apr. 2006, p. 374-378, vol. 70, No. 4., English-language Abstract.
"List of Enterprises providing samples relating to Cellulose Nanofiber", Part and Material Industries-CNF Workshop, Mar. 13, 2017.
"Simultaneous processing of defibration and surface modification in pulp by one step; Lamination of CNF to non-woven fabric to form a filter having high porosity", CONVERTECH, Feb. 2017, pp. 28-29.
"What is Features, Purposes and Theme of Cellulose Nanofiber? High intensity fine fiber has been a new dream material", http://www.maekawa-koichiro.com/entry/2016/09/19/151500, mae*ko online, Sep. 19, 2016, searched on Feb. 7, 2018.
Nechyporchuk et al., "Production of cellulose nanofibrils: A review of recent advances", Industrial Crops and Products, 2016, pp. 2-25, vol. 93.

* cited by examiner

[FIG. 1A]
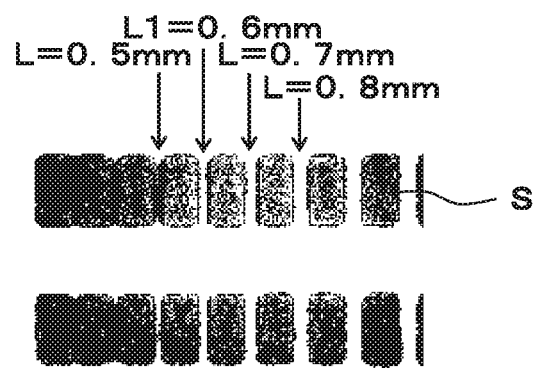
[FIG. 1B]
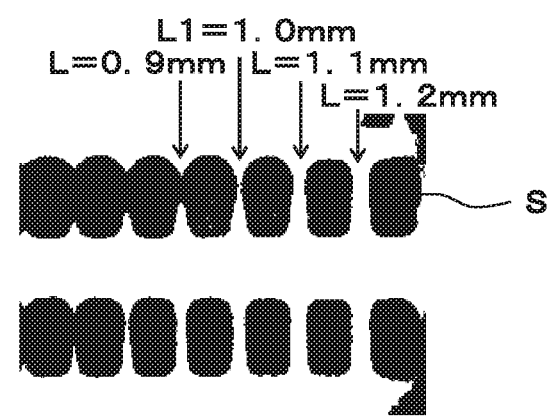

[FIG. 1C]
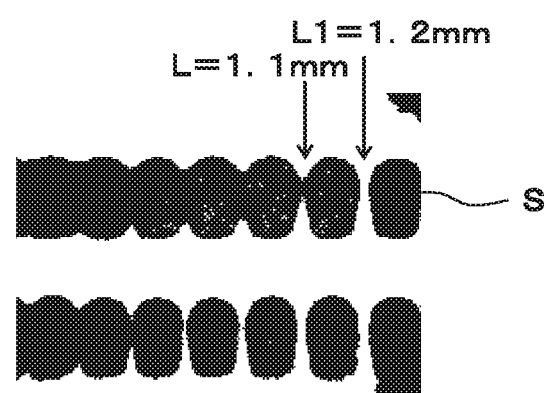

SOLDERING FLUX AND SOLDERING PASTE

CROSS-REFERENCE TO RELATED APPLICATIONS

This application is the United States national phase of International Application No. PCT/JP2018/025860 filed Jul. 9, 2018, and claims priority to Japanese Patent Application No. 2017-136138 filed Jul. 12, 2017, the disclosures of which are hereby incorporated by reference in their entirety.

TECHNICAL FIELD

The present invention relates to a soldering flux for use in soldering, and a soldering paste including the soldering flux and metal powder.

BACKGROUND

In general, fluxes used for soldering have effects of chemically removing metal oxides present on solder and the metal surface of a joint target to be soldered and allowing the movement of metal elements at the boundary between the two. Therefore, by soldering using the flux, an intermetallic compound can be formed between the solder and the metal surface of the joint target, so that strong joint can be obtained.

In a soldering paste including such a soldering flux and metal powder, thixotropy is imparted to the soldering paste by a thixotropic agent contained in the flux. Moreover, sagging of the soldering paste at the time of melting by heating is suppressed.

As the thixotropic agent, an aliphatic amide such as hydroxystearic acid bisamide, a wax (aliphatic ester) such as caster wax, or a synthetic polymer compound such as polyethylene glycol or polyethylene oxide is used (see, for example, Patent Document 1).

Further, as the thixotropic agent, a semi-synthetic polymer compound such as methyl cellulose, ethyl cellulose or hydroxyethyl cellulose is used (for example, see Patent Document 2).

PRIOR ART DOCUMENTS

Patent Documents

Patent Document 1: Japanese Patent No. 2013-78799 (paragraph [0028])
Patent Document 2: Japanese Patent No. 2011-104638 (paragraph [0049])

SUMMARY OF INVENTION

Problems to be Solved by the Invention

The flux components include a component that does not decompose or evaporate upon heating of soldering, which remains as a flux residue around the soldered portion after soldering. The component contained as the thixotropic agent also constitutes the flux residue.

In the conventional flux, if an amount of the thixotropic agent necessary for obtaining the effect of suppressing heating sagging is contained therein, the amount of the flux residue increases, and if it is applied to uses that do not involve washing, a large amount of the flux residue derived from the thixotropic agent may remain around the soldered portion, which may affect chemical and electrical reliability. Moreover, in uses involving washing of the flux residue, washing performance is bad.

The present invention has been made to solve such a problem, and an object thereof is to provide a soldering flux capable of suppressing the influence on the flux residue to obtain the effect of suppressing heating sagging, and a soldering paste including the soldering flux and metal powder.

Means for Solving the Problems

It has been found that, due to the fact that a flux contains a very small amount of nanofibers containing a polysaccharide as a natural polymer, a modified polysaccharide modified from a polysaccharide, or an incompletely modified polysaccharide that is being modified from a polysaccharide to a modified polysaccharide, heating sagging can be suppressed when this flux is used for soldering.

Therefore, the present invention provides a soldering flux containing 50 wt ppm or more and 3000 wt ppm or less, based on a total amount of the flux, of nanofibers containing one or more of polysaccharides, modified polysaccharides, and incompletely modified polysaccharides that are being modified from polysaccharides to modified polysaccharides.

The nanofibers containing one or more of polysaccharides, modified polysaccharides, and incompletely modified polysaccharides are preferably contained in an amount of 100 wt ppm or more and 500 wt ppm or less based on the total amount of the flux.

In addition, the nanofibers containing one or more of polysaccharides, modified polysaccharides, and incompletely modified polysaccharides are nanofibers containing any one of cellulose, lignocellulose, alkyl cellulose, hydroxyalkyl cellulose, maleic acid modified cellulose, chitin, and chitosan, or a combination of two or more thereof.

Furthermore, the present invention relates to a soldering paste including the above-described soldering flux and metal powder.

Effects of the Invention

In the present invention, heating sagging due to heating during soldering can be suppressed. In addition, as compared with the case where the effect of suppressing heating sagging is realized only with a thixotropic agent, the content of the nanofibers containing one or more of polysaccharides, modified polysaccharides, and incompletely modified polysaccharides (when a thixotropic agent is contained, the total content of the nanofibers and the thixotropic agent) can be reduced.

It is possible to reduce the content of the nanofibers containing one or more of polysaccharides, modified polysaccharides, and incompletely modified polysaccharides as compared with the case of using a conventional thixotropic agent, thereby reducing the flux residue.

Thus, the present invention can be applied to both uses that do not require washing of the flux residue and uses that require washing of the flux residue.

BRIEF DESCRIPTION OF THE DRAWINGS

FIG. 1A is an explanatory view showing a result of a heating sagging test.
FIG. 1B is an explanatory view showing a result of the heating sagging test.

FIG. 1C is an explanatory view showing a result of the heating sagging test.

EMBODIMENTS FOR CARRYING OUT THE INVENTION

<Example of Soldering Flux of the Present Embodiment>

The soldering flux according to the present embodiment contains 50 wt ppm or more and 3000 wt ppm or less of nanofibers containing one or more of polysaccharides, modified polysaccharides, and incompletely modified polysaccharides based on the total amount of the flux. The content of the nanofibers containing one or more of polysaccharides, modified polysaccharides, and incompletely modified polysaccharides is preferably 100 wt ppm or more and 500 wt ppm or less. The nanofibers containing one or more of polysaccharides, modified polysaccharides, and incompletely modified polysaccharides may be any of one or more polysaccharides, one or more types of modified polysaccharides or one or more of incompletely modified polysaccharides. Also, a combination of one or more polysaccharides and one or more modified polysaccharides, a combination of one or more polysaccharides and one or more incompletely modified polysaccharides, a combination of one or more modified polysaccharides and one or more incompletely modified polysaccharides may also be used. Further, a combination of one or more polysaccharides, one or more modified polysaccharides and one or more incompletely modified polysaccharides may be used.

The polysaccharides, modified polysaccharides or incompletely modified polysaccharides are any one of cellulose, lignocellulose, alkyl cellulose, hydroxyalkyl cellulose, maleic acid modified cellulose, chitin, and chitosan, or a combination of two or more thereof. The nanofibers are made by making these polysaccharides into fine fibers having a width of about several nanometers and a length of about several hundred nanometers.

The soldering flux contains a flux composition. The flux composition is any one of an organic acid, an amine, an amine hydrohalide, an organohalogen compound, a thixotropic agent, a rosin, a solvent, a surfactant, a base agent, a polymer compound, a silane coupling agent and a colorant, or a combination of two or more thereof.

Examples of the organic acid include succinic acid, glutaric acid, adipic acid, pimelic acid, suberic acid, azelaic acid, sebacic acid, dimer acid, propionic acid, 2,2-bishydroxymethylpropionic acid, tartaric acid, malic acid, glycolic acid, diglycolic acid, thioglycolic acid, dithioglycolic acid, stearic acid, 12-hydroxystearic acid, palmitic acid, and oleic acid.

Examples of the amine include ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimida zolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo [1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2, 2'-methylene bisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl] imino]bisethanol, 1-(1',2'-dicarboxyethyl)benzotriazole, 1-(2,3-dicarboxypropyl)benzotriazole, 1-[(2-ethylhexylamino) methyl]benzotriazole, 2,6-bis [(1H-benzotriazol-1-yl)methyl]-4-methylphenol, 5-methyl benzotriazole, and 5-phenyltetrazole.

The amine hydrohalide is a compound obtained by reacting an amine and hydrogen halide, and examples of the amine include ethylamine, ethylenediamine, triethylamine, methylimidazole, and 2-ethyl-4-methylimidazole. Examples of the hydrogen halide include hydrides of chlorine, bromine and iodine.

Examples of the organohalogen compound include 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

Examples of the thixotropic agent include wax-based thixotropic agents and amide-based thixotropic agents. Examples of such wax-based thixotropic agents include hydrogenated castor oil. Examples of such amide-based thixotropic agents include lauric acid amide, palmitic acid amide, stearic acid amide, behenic acid amide, hydroxystearic acid amide, saturated fatty acid amide, oleic acid amide, erucic acid amide, unsaturated fatty acid amide, p-toluenemethaneamide, aromatic amide, methylene bisstearic acid amide, ethylene bislauric acid amide, ethylene bishydroxystearic acid amide, saturated fatty acid bisamides, methylene bisoleic acid amide, unsaturated fatty acid bisamides, m-xylylene bisstearic acid amides, aromatic bisamides, saturated fatty acid polyamide, unsaturated fatty acid polyamide, aromatic polyamide, substituted amide, methylol stearic acid amide, methylol amide, and fatty acid ester amide.

Examples of the base agent include polyethylene glycol and a rosin. Examples of the rosin include raw material rosins such as gum rosin, wood rosin, and tall oil rosin, and derivatives obtained from the raw material rosins. Examples of the derivatives include purified rosins, hydrogenated rosins, disproportionated rosins, polymerized rosins and α,β unsaturated carboxylic acid modified products (acrylated rosins, maleated rosins, fumarated rosins, etc.); purified products, hydrides and disproportionated products of the polymerized rosins; and purified products, hydrides and disproportionated products of the α,β-unsaturated carboxylic acid modified products. Two or more of these can be used. In addition to the rosin-based resin, at least one resin selected from terpene resin, modified terpene resin, terpene phenol resin, modified terpene phenol resin, styrene resin, modified styrene resin, xylene resin and modified xylene resin can be further included. As the modified terpene resin, aromatic modified terpene resin, hydrogenated terpene resin, hydrogenated aromatic modified terpene resin or the like can be used. As the modified terpene phenol resin, a hydrogenated terpene phenol resin or the like can be used. As the modified styrene resin, a styrene acrylic resin, a styrene maleic acid resin, or the like can be used. Examples of the modified xylene resin include a phenol-modified xylene resin, an alkylphenol-modified xylene resin, a phenol-modified resole-type xylene resin, a polyol-modified xylene resin, and a polyoxyethylene-added xylene resin.

Examples of the solvent include water, alcohol solvents, glycol ether solvents, and terpineols. Examples of such alcohol solvents include isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis [2,2,2-tris(hydroxymethyl)ethyl] ether, 1-ethynyl-1-cyclohexanol, 1,4-cyclohexenediol, 1,4-cyclohexanedimethanol, erythritol, threitol, guaiacol glycerol ether, 3,6-dimethyl-4-octin-3,6-diol, and 2,4,7,9-tetramethyl-5-decyne-4,7-diol. Examples of such glycol ether solvents include diethylene glycol mono-2-ethyl hexyl ether, ethylene glycol monophenyl ether, 2-methylpentane-2,4-diol, diethylene glycol monohexyl ether, diethylene glycol dibutyl ether, and triethylene glycol monobutyl ether.

Examples of the surfactant include polyoxyalkylene acetylene glycols, polyoxyalkylene glyceryl ether, polyoxyalkylene alkyl ether, polyoxyalkylene ester, polyoxyalkylene alkylamine, and polyoxyalkylene alkylamide.

<Example of Soldering Paste of the Present Embodiment>

A soldering paste of the present embodiment includes the above-described soldering flux and metal powder. The metal powder is preferably Pb-free solder, and contains solder powder containing: Sn alone; Sn—Ag, Sn—Cu, Sn—Ag—Cu, Sn—Bi, Sn—In, or the like; or a product obtained by adding Sb, Bi, In, Cu, Zn, As, Ag, Cd, Fe, Ni, Co, Au, Ge, P, or the like to any of these alloys.

<Example of Action/Effect of Flux and Soldering Paste of the Present Embodiment>

In a soldering paste including a soldering flux containing 50 wt ppm or more and 3000 wt ppm or less, based on the total amount of the flux, of nanofibers containing one or more of polysaccharides, modified polysaccharides, and incompletely modified polysaccharides and metal powder, it is possible to suppress heating sagging of the soldering paste due to heating during soldering.

Conventionally, in a soldering paste including a soldering flux and metal powder, thixotropy is imparted to the soldering paste by a thixotropic agent contained in the flux. Moreover, sagging of the soldering paste at the time of melting by heating is suppressed.

However, when the content of the thixotropic agent is about 3000 wt ppm based on the total amount of the flux, the effect of suppressing heating sagging cannot be obtained.

Thus, as compared with the case where the effect of suppressing heating sagging is realized only with a thixotropic agent, the content of the nanofibers containing one or more of polysaccharides, modified polysaccharides, and incompletely modified polysaccharides (when a thixotropic agent is contained, the total content of the nanofibers and the thixotropic agent) can be reduced.

The nanofibers containing one or more of polysaccharides, modified polysaccharides, and incompletely modified polysaccharides constitute a flux residue, but it is possible to reduce the content thereof as compared with the case of using a conventional thixotropic agent, thereby reducing the flux residue.

Thus, the soldering flux of the present embodiment can be applied to a low residue flux used in an application that does not require washing of the flux residue. In such a low residue flux and a soldering paste including the low residue flux and metal powder, the soldering flux can improve the compatibility between the flux residue and a resin when the objects to be joined are joined with the soldering paste are sealed with the resin for fixation. Also, even when the resin is not used for sealing, chemical and electrical reliability can be improved.

Further, the soldering flux of the present embodiment can be applied to a water-soluble or resin-based flux used in an application that involves washing of the flux residue. In such a water-soluble or resin-based flux and a soldering paste including the water-soluble or resin-based flux and metal powder, the soldering flux can improve the washing performance for the flux residue.

EXECUTED EXAMPLES

Soldering fluxes of the Executed Examples and the Comparison Examples were prepared with the compositions indicated in Table 1 below, and soldering pastes were prepared using the soldering fluxes to verify heating sagging. Incidentally, the composition ratio in Table 1 is expressed in wt (weight) %.

In the Executed Examples, cellulose nanofibers were used as the nanofibers containing one or more of polysaccharides, modified polysaccharides, and incompletely modified polysaccharides. Cellulose, which is a polysaccharide, is a common substance derived from plants such as wood and cotton. In cellulose, natural polymer chains are combined to form nanofibers, which are further aggregated to form fibers. Since cellulose nanofibers are derived from plant fibers, the environmental load on production/disposal is small.

Cellulose nanofibers are commercially available as cellulose nanofibers for general industrial use because of easy handling. As a specific example of commercial products of cellulose nanofibers, RHEOCRYSTA 1-2SP manufactured by DKS Co., Ltd. can be indicated.

The commercial product of cellulose nanofibers is provided in a gelled form obtained by dispersing cellulose nanofibers in a solvent. Thus, a product obtained by dispersing nanofibers containing one or more of polysaccharides, modified polysaccharides, and incompletely modified polysaccharides in a solvent to gelatinize the nanofibers is referred to also as a nanofiber composition. Table 1 discloses the content of the cellulose nanofibers as well as the contents of the solvent and water used to gelatinize the cellulose nanofibers.

As for the cellulose nanofibers used in the Executed Examples, the nanofiber composition contains the cellulose nanofibers, a solvent and water, and contains 2 wt % of the cellulose nanofibers, 1 wt % of the solvent and 97 wt % of the water when the total amount of the nanofiber composition is 100 parts by weight.

In the Executed Examples, the flux composition contains 6 wt % of an organic acid, 1 wt % of an amine, 23 wt % of an amide-based thixotropic agent, and 70 wt % of a solvent when the total amount of the flux composition is 100 parts by weight.

The content of the cellulose nanofibers in the soldering flux is a proportion when the total amount of the nanofiber composition and the flux composition is 100 parts by weight.

The metal powder in the soldering paste is made of a Sn—Ag—Cu based solder alloy containing 3.0% by mass of Ag, 0.5% by mass of Cu, and the balance Sn, and has a particle size of φ20 to 38 μm. Further, the soldering paste includes 11.5 wt % of the soldering flux and 88.5 wt % of the metal powder.

<Evaluation of Heating Sagging>

(1) Verification Method

A heating sagging test is conducted by printing each of the soldering pastes on a copper plate using a stainless steel metal mask in which a soldering paste printing part is formed in the predetermined pattern described in FIG. 6 of JIS Z 3284-3, removing the metal mask, and then performing heat treatment at 150° C./10 min to quantify the heating sagging of the soldering paste. The thickness of the metal mask is 0.2 mm, the soldering paste printing part is a square opening, having a size of 3.0×1.5 mm. In the soldering paste printing part, a plurality of openings having the same size are arranged at different intervals, and the intervals L between the respective openings are 0.2-0.3-0.4-0.5-0.6-0.7-0.8-0.9-1.0-1.1-1.2 mm.

(2) Criterion of Determination

FIGS. 1A, 1B and 1C are explanatory views showing results of the heating sagging test. The heating sagging was determined at a minimum interval L1 at which the soldering pastes printed at the above-mentioned predetermined intervals were not integrated after heating. FIG. 1A shows the case where the content of the cellulose nanofibers is 100 wt ppm, FIG. 1B shows the case where the content of the cellulose nanofibers is 2000 wt ppm, and FIG. 1C shows the case where the content of the cellulose nanofibers is 0 wt ppm.

⊚: The heating sagging test result is 0.6 mm or less
◯: The heating sagging test result is 1.0 mm or less
x: The heating sagging test result exceeds 1.0 mm In the present invention, it was found that, as demonstrated in Executed Examples 1 to 6, when the total amount of the flux is 100 parts by weight, the cellulose nanofibers are contained in an amount of 0.3 wt % (=3000 wt ppm) at a maximum, so that sufficient effects on heating sagging can be obtained, and that effects are developed when the cellulose nanofibers are contained in an amount of 0.005 wt % (=50 wt ppm) at a minimum. For example, as shown in FIG. 1A, when the content of the cellulose nanofiber was 100 wt ppm, the minimum interval L1 at which the soldering pastes were not integrated after heating was 0.6 mm. As shown in FIG. 1B, when the content of the cellulose nanofibers was 2000 wt ppm, the minimum interval L1 at which the soldering pastes were not integrated after heating was 1.0 mm.

On the other hand, in Comparison Example 1 free of cellulose nanofibers and containing modified cellulose as the thixotropic agent in the flux composition, heating sagging could not be suppressed. In order to obtain the effect of suppressing heating sagging, it was necessary for the flux composition to contain several wt % or more, at least 1 wt % (=10000 wt ppm) of the thixotropic agent. For example, as shown in FIG. 1C, when the content of the cellulose nanofibers was 0 wt ppm, the minimum interval L1 at which the soldering pastes were not integrated after heating was 1.2 mm.

Further, in Comparison Example 2 containing 0.5 wt % (=5000 wt ppm) of cellulose nanofibers, heating sagging could not be suppressed.

Thus, it was found that, in a soldering paste including a flux added with cellulose nanofibers and metal powder, the heating sagging of the soldering paste can be suppressed due to the fact that the cellulose nanofibers are contained, in a very small amount, in the flux.

The cellulose nanofibers constitute a flux residue, but with the amount thereof to be added can be reduced as compared with the case of using a conventional thixotropic agent, and thus it is possible to reduce the flux residue. When they are applied to a low residue flux and a soldering paste including such a low residue flux and metal powder, they can improve the compatibility between the resin and the flux residue during resin sealing. Also, even when resin sealing is not performed, chemical and electrical reliability can be improved. In addition, when they are applied to a water-soluble or resin-based flux that requires washing and a soldering paste including the water-soluble or resin-based flux and metal powder, the washing performance is improved.

The invention claimed is:

1. A soldering flux comprising:
a solvent; and
100 wt ppm or more and 2000 wt ppm or less, based on a total amount of the flux, of nanofibers,
wherein the nanofibers contain cellulose and are dispersed in the solvent in a fibrous form.

2. The soldering flux according to claim 1, wherein the nanofibers are contained in an amount of 100 wt ppm or more and 500 wt ppm or less, based on the total amount of the flux.

3. A soldering paste comprising:
the soldering flux of claim 1 and a metal powder.

TABLE 1

|  | Executed Example 1 | Executed Example 2 | Executed Example 3 | Executed Example 4 | Executed Example 5 | Executed Example 6 | Comparison Example 1 | Comparison Example 2 |
| --- | --- | --- | --- | --- | --- | --- | --- | --- |
| Flux composition (wt %) | 99.745 | 99.49 | 97.45 | 94.9 | 89.8 | 84.7 | 99.49 | 74.5 |
| 2-Phenoxyethanol (wt %) | 0.0025 | 0.005 | 0.025 | 0.05 | 0.1 | 0.15 | 0.005 | 0.25 |
| Water (wt %) | 0.2475 | 0.495 | 2.475 | 4.95 | 9.9 | 14.85 | 0.495 | 24.75 |
| Cellulose nanofibers (wt %) | 0.005 | 0.01 | 0.05 | 0.1 | 0.2 | 0.3 | 0 | 0.5 |
| Hydroxyethyl cellulose (wt %) | 0 | 0 | 0 | 0 | 0 | 0 | 0.01 | 0 |
| Cellulose nanofiber content | 50 wt ppm | 100 wt ppm | 500 wt ppm | 1000 wt ppm | 2000 wt ppm | 3000 wt ppm | 0 wt ppm | 5000 wt ppm |
| Heating sagging test | ◯ | ⊚ | ⊚ | ◯ | ◯ | ◯ | X | X |

4. The soldering paste according to claim 3, wherein the nanofibers are contained in an amount of 100 wt ppm or more and 500 wt ppm or less, based on the total amount of the flux.

* * * * *